No. 35,209. PATENTED MAY 13, 1862.
J. C. BIRDSELL.
MACHINE FOR THRESHING CLOVER AND HULLING AND CLEANING THE SEED.
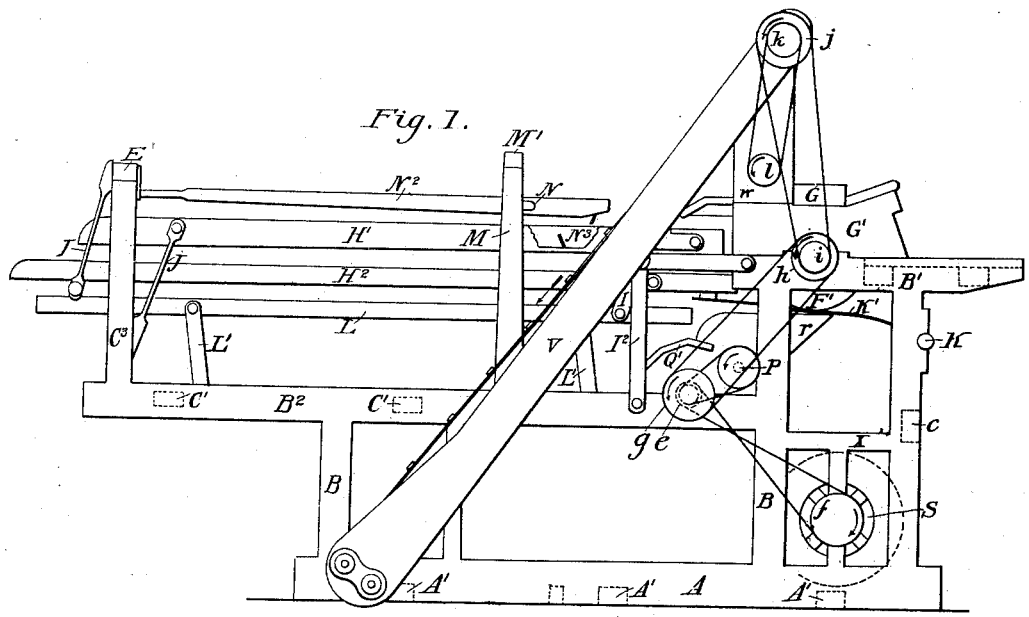
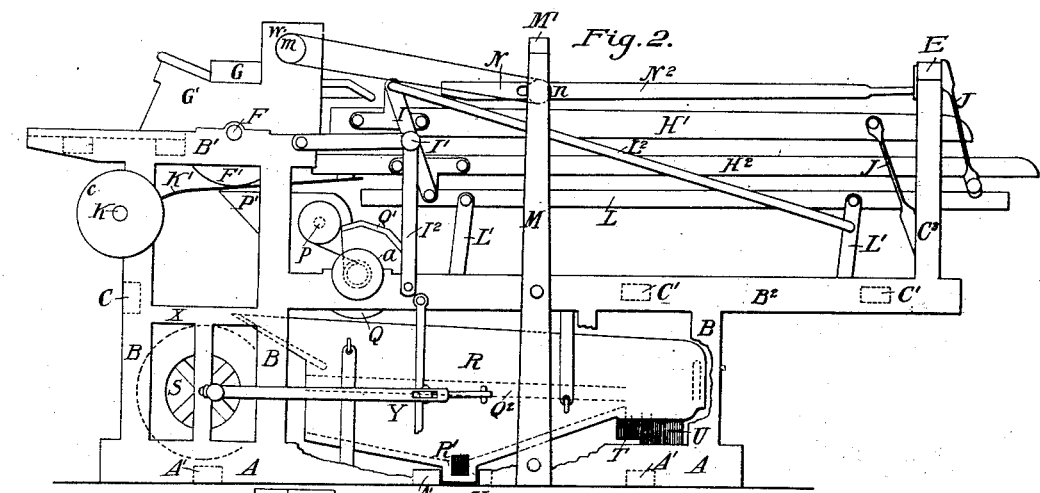
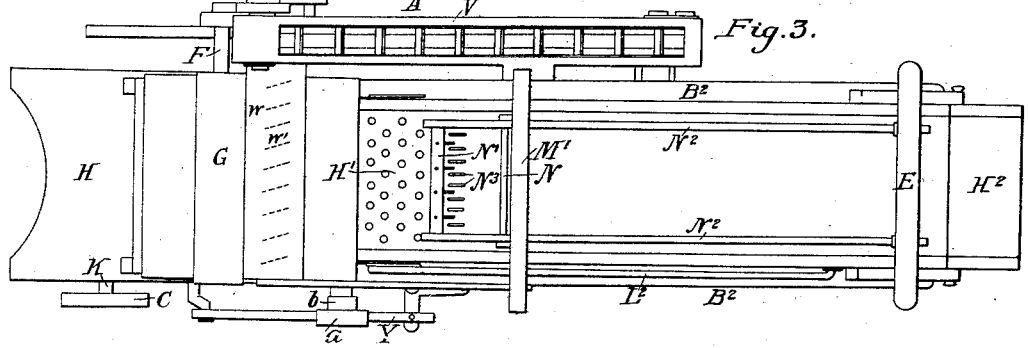

UNITED STATES PATENT OFFICE.

JOHN C. BIRDSELL, OF WEST HENRIETTA, NEW YORK.

THRESHING CLOVER AND HULLING AND CLEANING THE SEED.

Specification of Letters Patent No. 35,209, dated May 13, 1862.

*To all whom it may concern:*

Be it known that I, JOHN C. BIRDSELL, of West Henrietta, in the county of Monroe and State of New York, have invented certain new and useful Improvements in Machines for Threshing Clover and Cutting and Cleaning the Seed; and I do hereby declare that the same are described and represented in the following specifications and drawings.

To enable others skilled in the art to make and use my improvements I will proceed to describe their construction and operation referring to the drawings in which the same letters indicate like parts in each of the figures.

Figures 1, and 2 are side elevations of a machine with my improvements. Fig. 3, is a plan or top view of the machine. These drawings are about one inch to the foot.

The nature of my invention and improvements in machines for threshing clover, and hulling and cleaning the seed, consists in a vibrating or traversing table under the bolls or screens, for conveying the bolls, seed and chaff separated from the straw by the bolts to the hulling cylinder. And in a spout or trough between the screens and tailing trough, to catch all matter heavier than the chaff and tailings, as pieces of straw sticks gravel etc., heavier than the chaff which would load the screens if returned to the hulling cylinder and wear it out unnecessarily. Also in a spiral conveyer for distributing the tailings and chaff from the elevator uniformly the whole length of the hulling cylinder. And in hanging the bolts or screens on swinging arms and springs. And in hanging the bars or arms in the center which work the screens, so as to move them in opposite directions by the same crank and link. And in providing the hulling cylinder with feeding rollers. Also in one or more rakes in combination with a comb or combs on the bolts or screens.

In the accompanying drawings A, A, are side sills, connected by the cross sills A', A', making a strong frame for the base of the machine.

B, B, are posts fastened in the sills A, and support the rails B', and B², the whole being framed together as shown in the drawing. The two front posts are connected by the bar C, and the rails B², by the bars C'. There are some standards C³, C³ fastened in the rear ends of the rails B² and connected by the top bar E. The shaft F, of the threshing cylinder F', turns in boxes on the rails B'; this cylinder is provided with teeth one and one half inches long, made of round iron three-eighths of an inch in diameter, the outer ends being flattened to make them wedge shaped; there are several rows of teeth in the cylinder—placed about two inches apart lengthwise of the cylinder. The concave G, over the cylinder is supported by the casings G', it is provided with two rows of teeth made of iron either round or square or similar to those in the cylinder and the same distance apart; the teeth in one row being set opposite the spaces in the other.

H, is the feeding table supported by bars between the rails B'; upon this table the clover is laid and fed to the cylinder F', which turns in the direction indicated by the arrow and carries the clover up between the teeth of the concave threshing the bolls and seed from the straw or stalks and throws the threshed material onto the upper bolt or screen H' which is over the screw H². The screens are made of thin boards and the holes in the upper screen are about one and one-eighth inches in diameter the holes in the lower one about three-fourths of an inch in diameter, which screens are hung on the arms I, which vibrate on the rod I', supported by the stands I² fastened to the frame of the machine. The rear ends of these screens are hung on springs J, J, from the standards C³. The crank shaft K, turns in boxes fastened to the posts B, and the crank is connected by the link K', to the lower screen H², and traverses each screen with a quick motion, and the screens are so hung that they descend as they move toward the cylinder and slip under the straw or stalks, and rise as they move from the cylinder carrying the straw or stalks back with them and throw them off at the rear of the machine, while the bolls, seed and chaff pass through the screens and fall onto the table L, below the screens. The standards M, M, are fastened to the frame and connected by the top bar M'. The crank shaft N, turns in the standards M, and operates the rake N'. The bars N², which carry the rake extend from the crank N, through brackets on the top bar E in which they traverse.

The teeth of the rake work between the teeth of the comb N³, on the upper screen, and pick the threshed clover to pieces when it is green or moist, and shake out the bolls, seed and chaff so that they fall through the screen. The table L, is supported by the links L' from the rail B² and is traversed by the rod L² from the arm I, and it descends as it maves from the cylinder, slipping back under the bolls and seed, and rises as it moves toward the cylinder carry the bolls and seed with it, throwing them off onto the feed rollers P, P, which feed the hulling cylinder Q, whose shaft turns in boxes on the rails B². This cylinder Q, is covered with wrought iron roughened like a common rasp, (such as are used to trim horse hoofs and reduce and smooth wooden handles) and case hardened, it is provided with a concave Q' roughened and hardened in a similar manner. The teeth on the cylinder and concave, project about a sixteenth of an inch or a little more, and the concave is set, so that the space between the points of the teeth on the concave and cylinder, will be about one-eighth of an inch where the bolls and seed enter between them from the feeding rollers; this space is gradually reduced so that the points of the teeth are about one-sixteenth of an inch apart where the seed escapes and falls or passes onto the screens Q² in the shoe R, which screens Q² are represented by dotted lines in Fig. 2.

The side of the casing is omitted in Fig. 2, to show the side of the shoe R, which is made in the form shown, and provided with two screens Q², one above the other, so arranged that the blast from the fan s, passes over, between and under the screens; and the seed which passes through is collected in the trough or spout R' in the center of the shoe from which it passes out of the machine at the bottom, while the bolls and chaff with the tailings pass off of the screens, the light portion passing out of the machine while the heavier portion or tailings fall into the troughs T and U, at the end of the screens. The first is narrow and intended to catch all heavy matter, sticks, straw, gravel, etc., and conduct them out of the machine at the bottom, while the tailings or bolls of unhulled seed etc. are caught by the second trough, and conveyed into the elevator v, which consists of a long inclined trough provided with one pulley at the upper, and two at the lower end, around which the endless belt of slats or cups traverse, and carries the tailings from the trough or spout U, up into the horizontal trough w, on the top of the machine over the feeding rollers of the hulling cylinder, which trough is provided with a spiral conveyer w' which distributes the chaff and tailings from the elevator uniformly onto the feeding rollers and the hulling cylinder, which works it over the second time, to hull any seed that escaped when passing through the huller the first time. The feeding rollers P, P, have a roughened or toothed surface and turn in opposite direction by bands from pulleys on the shaft of the hulling cylinder, so as to take the boll seed and chaff from the feed board P', and feed them to the hulling cylinder Q.

The shaft of the fan s turns in standards between the bar X, and the sills A is provided with a case which directs the blast over, between, and under the screens in the shoe. The shoe R, is supported by links from the rails B², and sills A, and it is traversed or shaken by the links and bell crank Y, which connect it to the crank on the shaft of the fan.

This machine may be operated by belts as follows, A belt from some power may be applied to the pulley a, on the shaft of the cylinder Q, which carries the pulley b, with a belt to the pulley c, on the crank shaft K, to turn it and traverse the screens and table. The pulley e, on the opposite end of the shaft of cylinder Q, carries a band to turn the fan by the pulley f. And a band from the pulley g, carries the threshing cylinder by the pulley h; and the pulley i, carries a belt which turns the upper pulley in the elevator V, by the pulley j. The pulley k, carries a belt which turns the spiral conveyer W', by the pulley l, and the pulley m, carries a belt which turns the crank and operates the rake by the pulley n.

The trough T, is a great advantage and improvement, as it separates pieces of straw sticks and gravel from the tailings and prevent them from being returned to the huller and screens, so as to wear them unnecessarily. I contemplate that the conveyer W', may be arranged in such other position as may be convenient or desirable, and that the table L, may be operated by such devices, other than those described, as may be preferred.

I believe I have described and represented the improvements which I have invented in machines for threshing clover and hulling and cleaning the seed, so as to enable any person skilled in the art to make and use them. I will now state what I desire to secure by Letters Patent, to wit.

I claim—

1. In combination with the hulling cylinder the vibrating or traversing table L, under the belts or screens, for conveying the bolls, seed and chaff, separated from the straw to the hulling cylinder, substantially as described.

2. I claim the spout or trough T, between the screens and tailing trough for the purpose specified.

3. I claim the spiral conveyer W' in combination with the hulling cylinder, for distributing the tailings from the elevator uniformly to the feed rollers and hulling cylinders.

4. I claim hanging the belts or screens H' H² on swinging arms and springs when the bars or arms I, I are hung in the center so as to move the screens in opposite directions by the same crank and link.

5. In combination with the hulling cylinder I claim the feeding rollers P, P, for the purpose specified substantially as described.

6. I claim one or more rakes N' in combination with the comb or combs on the bolt or screen for the purpose specified.

JOHN C. BIRDSELL.

Witnesses:
  JAMES W. SNOW,
  JOHN HILL.